G. DUNN.
SQUIRREL CAGE ROTOR FOR ELECTRIC MOTORS.
APPLICATION FILED APR. 12, 1910.
1,013,753.
Patented Jan. 2, 1912.
2 SHEETS—SHEET 1.
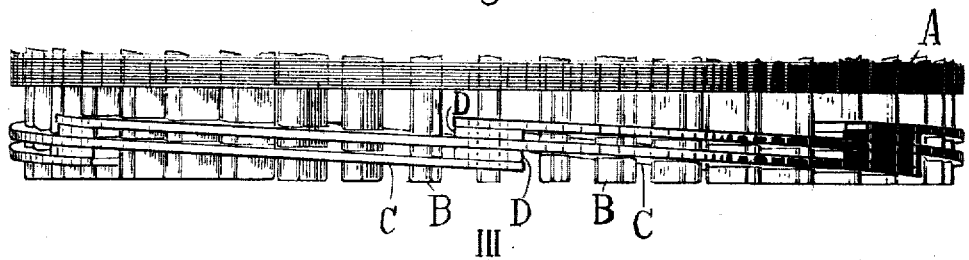
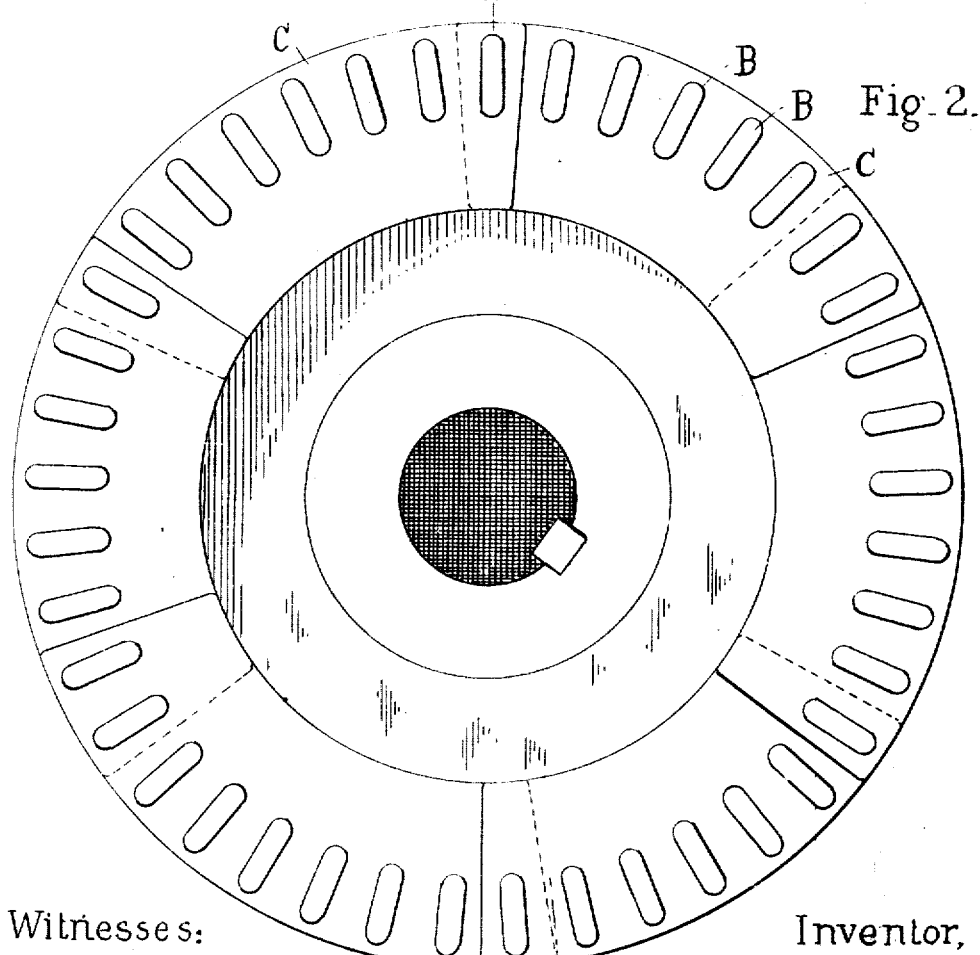
Witnesses:
Samuel W. Balch
Frank C. Cole
Inventor,
Gano Dunn,
by Thomas Ewing, Jr.,
Attorney.

G. DUNN.
SQUIRREL CAGE ROTOR FOR ELECTRIC MOTORS.
APPLICATION FILED APR. 12, 1910.
1,013,753.
Patented Jan. 2, 1912.
2 SHEETS—SHEET 2.
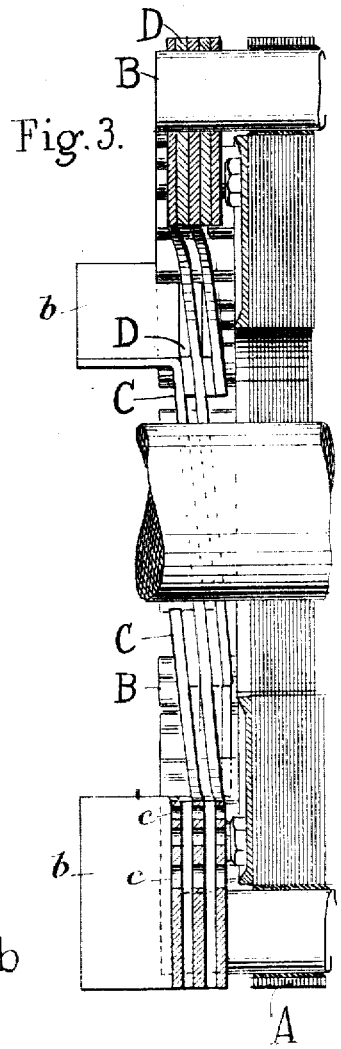
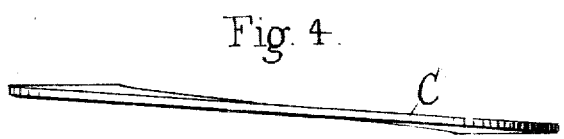
Fig. 4.
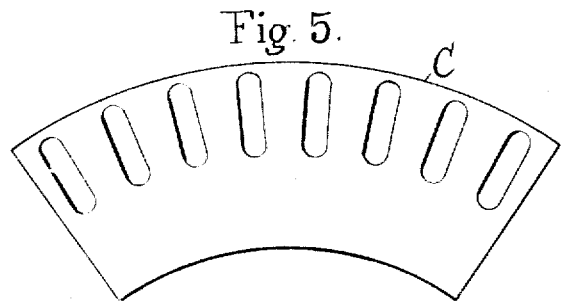
Fig. 5.
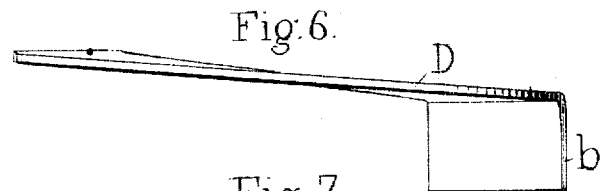
Fig. 6.
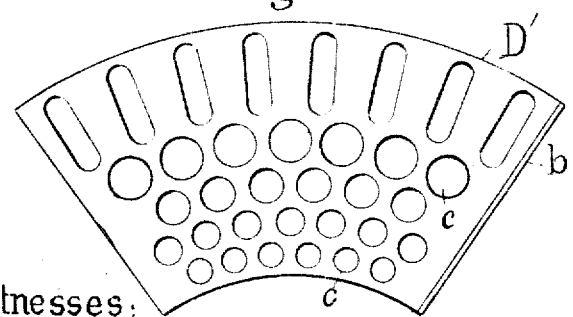
Fig. 7.
Witnesses:
Samuel W. Balch
James Law
Inventor,
Gano Dunn,
by Thomas Ewing, Jr.,
Attorney

UNITED STATES PATENT OFFICE.

GANO DUNN, OF EAST ORANGE, NEW JERSEY, ASSIGNOR TO CROCKER-WHEELER COMPANY, OF AMPERE, NEW JERSEY, A CORPORATION OF NEW JERSEY.

SQUIRREL-CAGE ROTOR FOR ELECTRIC MOTORS.

1,013,753.  Specification of Letters Patent.   Patented Jan. 2, 1912.

Application filed April 12, 1910. Serial No. 554,941.

*To all whom it may concern:*

Be it known that I, GANO DUNN, a citizen of the United States of America, and a resident of East Orange, county of Essex, and State of New Jersey, have invented certain new and useful Improvements in Squirrel-Cage Rotors for Electric Motors, of which the following is a specification.

This invention relates to the construction of the secondary element of the rotor of an induction motor in combination with the rotor body.

The object of the invention is to provide a form of squirrel-cage construction for the secondary element in which the electric flux is well distributed, which will run cool, in which the longitudinal conductor bars are interchangeable, and in which the ends are electrically connected by segments which afford parallel paths for the current and in which the usual tendency of the current to concentrate in those portions of the end rings which lie nearest the core will be prevented and an even distribution of the electric flux will be insured.

A further object of the invention is to provide a construction in which all the segments may be alike and formed of sheet metal by punching and readily assembled.

In the accompanying two sheets of drawings, which form a part of this application, Figure 1 is a side view showing one end of a rotor embodying my invention. Fig. 2 is a face view of the same. Fig. 3 is a section through one end of the rotor on the line III—III of Fig. 2 embodying a modified form of my invention. Fig. 4 is an edge view of one of the segments of the form of Figs. 1 and 2. Fig. 5 is a face view of the same. Fig. 6 is an edge view of the segment embodying a modified form of my invention of Fig. 3. Fig. 7 is a face view of the same.

In the form shown in Figs. 1, 2, 4 and 5, a rotor body consisting of laminated plates of iron A constitutes the magnetic core of the rotor for an induction motor and supports in perforations around its periphery, a series of straight copper conductor bars B B of uniform section throughout. The ends of the bars project beyond the core. Helical segments C C suitably formed by punching have openings which tightly engage the ends of the bars. The segments are usually of sheet copper but I do not confine myself to this material as under certain conditions other materials, as brass, iron or aluminum, may be preferable. They are placed on the ends of the bars obliquely and each electrically connects a number of adjoining bars. So far as possible the segments are so distributed that the inner end of each segment engages the same bar with the outer end of another segment. The whole number of bars is often, though not necessarily prime, and even when not, the number of bars which it is convenient to span by each segment, may not be a factor of the whole number of bars. This, however, does not involve the employment of segments of different lengths as the necessary adjustment can be effected by increasing the lap to two bars at some of the points of lapping. The segments are preferably spaced for ventilation. The spacing is preserved by slipping washers D D over the ends of the bars. These may be formed by cutting up a segment into small pieces, each of which includes one or two perforations. These washers are preferably located at the bars where segments begin and end so as to supplement the electrical connection between successive segments which is afforded by the bar in transferring the current from the segment ending on the outside to the beginning of the next segment on the inside.

In the form shown in Figs. 3, 6 and 7 the ends of the helical segments C' C' are shown flanged at *b b* forming wind-vanes which by centrifugal action induce a rapid flow of air over the segments and their flanges to increase the cooling. In addition to the perforations in the segments for receiving the ends of the conductor bars additional perforations *c c* may be provided to increase the electrical resistance and improve the starting torque. In assembling there is difficulty on account of the overlap when putting on the last segments and the difficulty is solved by sliding the bars endwise out of the way while setting these segments in place.

What I claim as new, and desire to secure by Letters Patent of the United States, is—

1. In a squirrel-cage rotor adapted for use as the secondary element of an induction motor, the combination of a laminated core, conductor bars carried thereby, and a plurality of oblique overlapping segments, each having openings which tightly engage the ends of the conductor bars, substantially as described.

2. In a squirrel-cage rotor adapted for use as the secondary element of an induction motor, the combination of a laminated core, conductor bars carried thereby, and a plurality of oblique segments each having openings which tightly engage the ends of the conductor bars and overlapping with different amounts of overlap, substantially as described.

3. In a squirrel-cage rotor adapted for use as the secondary element of an induction motor, the combination of a laminated core, conductor bars carried thereby, and a plurality of like oblique segments each having openings which tightly engage the ends of the conductor bars and overlapping with different amounts of overlap, substantially as described.

4. In a squirrel-cage rotor adapted for use as the secondary element of an induction motor, the combination of a laminated core, conductor bars carried thereby, and a plurality of oblique overlapping spaced segments each having openings which tightly engage the ends of the conductor bars, substantially as described.

5. In a squirrel-cage rotor adapted for use as the secondary element of an induction motor, the combination of a laminated core, conductor bars carried thereby, and a plurality of oblique overlapping segments each having openings which tightly engage the ends of the intermediate conductor bars which it spans, substantially as described.

6. In a squirrel-cage rotor adapted for use as the secondary element of an induction motor, the combination of a laminated core, conductor bars carried thereby, and a plurality of oblique segments overlapping with different amounts of overlap and each having openings which tightly engage the ends of the intermediate conductor bars which it spans, substantially as described.

7. In a squirrel-cage rotor adapted for use as the secondary element of an induction motor, the combination of a laminated core, conductor bars carried thereby, and a plurality of like oblique segments overlapping with different amounts of overlap and each having openings which tightly engage the ends of the intermediate conductor bars which it spans, substantially as described.

8. In a squirrel-cage rotor adapted for use as the secondary element of an induction motor, the combination of a laminated core, conductor bars carried thereby, and a plurality of oblique overlapping spaced segments each having openings which tightly engage the ends of the intermediate conductor bars which it spans, substantially as described.

9. In a squirrel-cage rotor adapted for use as the secondary element of an induction motor, the combination of a laminated core, conductor bars carried thereby, a plurality of oblique overlapping segments electrically connecting the ends of the conductor bars, and spacing washers located at points of overlap and electrically connecting the segments, substantially as described.

10. In a squirrel-cage rotor adapted for use as the secondary element of an induction motor, the combination of a laminated core, conductor bars carried thereby, and a plurality of oblique overlapping spaced segments electrically connecting the ends of the conductor bars, the segments having flanged ends forming wind-vanes, substantially as described.

11. In a squirrel-cage rotor adapted for use as the secondary element of an induction motor, the combination of a laminated core, conductor bars carried thereby, and a plurality of oblique overlapping spaced segments electrically connecting the ends of the conductor bars, the segments having flanged ends forming wind-vanes, and having perforations to increase their electrical resistance, substantially as described.

Signed at East Orange, N. J., this 9th day of April, 1910.

GANO DUNN.

Witnesses:
J. MACDONALD SMITH,
H. C. HARRISON.